(12) United States Patent
Bouchy et al.

(10) Patent No.: US 9,546,329 B2
(45) Date of Patent: Jan. 17, 2017

(54) PROCESS FOR THE PRODUCTION OF MIDDLE DISTILLATES IN WHICH THE FEEDSTOCK ORIGINATING FROM THE FISCHER-TROPSCH PROCESS AND THE HYDROGEN STREAM CONTAIN A LIMITED OXYGEN CONTENT

(71) Applicants: ENI S.P.A., Rome (IT); IFP ENERGIES NOUVELLES, Rueil-Malmaison (FR)

(72) Inventors: Christophe Bouchy, Lyons (FR); Aline Grezaud, Lyons (FR); Jean Philippe Heraud, Saint Pierre de Chandieu (FR); Hugues Dulot, Lyons (FR); Vincenzo Calemma, Milan (IT)

(73) Assignees: IFP ENERGIES NOUVELLES, Rueil-Malmaison (FR); ENI S.P.A., Rome (IT)

( * ) Notice: Subject to any disclaimer, the term of this patent is extended or adjusted under 35 U.S.C. 154(b) by 671 days.

(21) Appl. No.: 13/661,183

(22) Filed: Oct. 26, 2012

(65) Prior Publication Data
US 2013/0105358 A1   May 2, 2013

(30) Foreign Application Priority Data
Oct. 27, 2011 (FR) ..................... 11 03278

(51) Int. Cl.
| | |
|---|---|
| *C10G 65/12* | (2006.01) |
| *C10G 65/04* | (2006.01) |
| *B01J 21/12* | (2006.01) |
| *B01J 23/42* | (2006.01) |
| *B01J 35/00* | (2006.01) |
| *B01J 35/10* | (2006.01) |
| *B01J 37/00* | (2006.01) |
| *B01J 23/44* | (2006.01) |

(52) U.S. Cl.
CPC ................ *C10G 65/12* (2013.01); *B01J 21/12* (2013.01); *B01J 23/42* (2013.01); *B01J 35/0066* (2013.01); *B01J 35/108* (2013.01); *B01J 35/1019* (2013.01); *B01J 35/1042* (2013.01); *B01J 35/1061* (2013.01); *B01J 37/0009* (2013.01); *C10G 65/043* (2013.01); *B01J 23/44* (2013.01); *C10G 2300/1022* (2013.01); *C10G 2300/1081* (2013.01); *C10G 2300/202* (2013.01); *C10G 2300/4006* (2013.01); *C10G 2300/4012* (2013.01); *C10G 2300/4018* (2013.01); *C10G 2300/42* (2013.01); *C10G 2400/04* (2013.01); *C10G 2400/06* (2013.01); *C10G 2400/08* (2013.01)

(58) Field of Classification Search
CPC ............. C10G 2/30; C10G 2/32; C10G 45/02; C10G 45/32; C10G 47/04; C10G 47/12; C10G 65/12
USPC ...................................... 208/57, 89
See application file for complete search history.

(56) References Cited

U.S. PATENT DOCUMENTS

| | | | |
|---|---|---|---|
| 7,404,890 B2* | 7/2008 | Benazzi et al. ............... | 208/108 |
| 7,745,502 B2* | 6/2010 | Lowe et al. ................... | 518/709 |
| 2011/0139678 A1* | 6/2011 | Van De Graaf et al. ....... | 208/60 |

FOREIGN PATENT DOCUMENTS

EP          0 583 836 A1      2/1994

OTHER PUBLICATIONS

Search Report of FR 1103278 (Aug. 27, 2012).

* cited by examiner

*Primary Examiner* — Renee E Robinson
(74) *Attorney, Agent, or Firm* — Millen White Zelano and Branigan, PC; John Sopp; Anthony Zelano

(57) ABSTRACT

A process for the production of middle distillates from a paraffinic feedstock produced by Fischer-Tropsch synthesis comprising a limited content of molecules containing at least one oxygen atom. In the process, the feedstock is subjected to at least one hydrocracking/hydroisomerization stage in the presence of a hydrogen stream also containing a limited atomic oxygen content.

7 Claims, No Drawings

PROCESS FOR THE PRODUCTION OF MIDDLE DISTILLATES IN WHICH THE FEEDSTOCK ORIGINATING FROM THE FISCHER-TROPSCH PROCESS AND THE HYDROGEN STREAM CONTAIN A LIMITED OXYGEN CONTENT

The present invention relates to a process for the production of middle distillates from a paraffinic feedstock produced by Fischer-Tropsch synthesis comprising a limited content of molecules containing at least one oxygen atom in which said feedstock is subjected to at least one hydrocracking/hydroisomerization stage in the presence of a hydrogen stream also containing a limited content of molecules containing at least one oxygen atom.

PRIOR ART

In the low-temperature Fischer-Tropsch process, the synthesis gas ($CO+H_2$) is catalytically converted to water and a hydrocarbon effluent comprising unsaturates, oxygen-containing products and essentially linear paraffinic hydrocarbons in gaseous, liquid or solid form. Said effluent thus produced, constituting the paraffinic feedstock used according to the invention, is generally devoid of heteroatom impurities such as, for example, sulphur, nitrogen or metals. Said paraffinic feedstock also contains in practice little or no aromatics, naphthenes and more generally rings. Conversely, said paraffinic feedstock can have a not insignificant content of oxygen products which is generally less than 10% by weight approximately and also an unsaturates content (olefinic products in general) generally less than 20% by weight. However, said feedstock, mainly constituted by normal paraffins, cannot be used as it is, in particular due to its low-temperature properties that are not very compatible with the usual uses for petroleum cuts. For example, the melting point of a linear hydrocarbon containing 20 carbon atoms per molecule (boiling point equal to approximately 340° C., i.e. often comprised within the middle distillates cut) is approximately +37° C., which makes its use impossible, as the specification associated with these low-temperature properties requires the filterability limit temperature to be −15° C. for gas oil. Moreover the paraffinic feedstock can contain more or less substantial quantities of long paraffins (typically having more than 22 carbon atoms) having a boiling point that is too high to be incorporated into the middle distillates range or also short paraffins (typically having less than 9 carbon atoms) the boiling point of which is too low to be incorporated into the middle distillates range. The hydrocarbons originating from the Fischer Tropsch process comprising mainly n-paraffins must thus be converted into products that can be more easily upcycled, such as for example kerosene and gas oil, which are obtained, for example, after catalytic hydroisomerization and hydrocracking reactions.

All the catalysts currently used in hydroisomerization/hydrocracking are of the dual-function type combining an acid function with a hydrogenating function. The acid function is provided by large surface-area supports (generally 150 to 800 $m^2 \cdot g^{-1}$) having a Bronsted acidity, such as halogenated (in particular chlorinated or fluorinated) aluminas, phosphorated aluminas, combinations of boron and aluminium oxides, silica-aluminas or also zeolites. The hydrogenating function is provided either by one or more metals from group VIII of the periodic table of the elements, such as iron, cobalt, nickel, ruthenium, rhodium, palladium, osmium, iridium and platinum, or by a combination of at least one group VI metal such as chromium, molybdenum and tungsten and at least one group VIII metal.

The balance between the two functions, acid and hydrogenating, is one of the parameters which govern the activity and selectivity of the catalyst. A weak acid function and a strong hydrogenating function give catalysts that are not very active and selective vis-à-vis the isomerization while a strong acid function and a weak hydrogenating function give catalysts that are very active and selective vis-à-vis the cracking. A third possibility is to use a strong acid function and a strong hydrogenating function in order to obtain a catalyst that is very active but also very selective vis-à-vis the isomerization. It is therefore possible, by careful choice of each of the functions, to adjust the activity/selectivity pair of the catalyst.

In the field of hydrocracking and hydroisomerization of paraffinic feedstocks originating from the Fischer-Tropsch synthesis, it is known that the presence of oxygen-containing compounds in the paraffinic feedstocks originating from the Fischer-Tropsch synthesis can affect the balance between the acid and hydrogenating functions of the hydrocracking/hydroisomerization catalyst placed downstream and therefore affect its catalytic properties. The oxygen-containing compounds present in said paraffinic feedstocks are generally oxides of carbon such as carbon monoxide and carbon dioxide (CO and $CO_2$), water or also alcohols and/or carboxylic acids, esters and ketones.

For example D. Leckel (D. Leckel, Energy & Fuels 2005, 19, 1795-1803) compares the performance of a hydrocracking catalyst of a paraffinic feedstock originating from the Fischer-Tropsch synthesis that has been previously hydrotreated, i.e. containing a reduced content of oxygen-containing compounds such as alcohols and/or carboxylic acids with the performances of a hydrocracking catalyst of a paraffinic feedstock originating from the Fischer-Tropsch synthesis that has not been previously hydrotreated, i.e. still containing said oxygen-containing compounds. It is reported that the removal of said oxygen-containing compounds from the feedstock makes it possible to improve the activity of the hydrocracking catalyst by about fifteen degrees Celsius but reduces the selectivity of the catalyst vis-à-vis the production of middle distillates.

Patent EP 0 583 836 B2 teaches the use of a process for the preparation of gas oil implementing a) a stage of hydrotreating the hydrocarbon feedstock originating from the Fischer-Tropsch synthesis for saturating the olefins of the feedstock and decomposing the oxygen products present, followed by a stage (b) of removal of the $C_4^-$ fraction of the hydrotreated feedstock and a stage c) of hydrocracking of at least one portion of the hydrocarbon effluent originating from stage b). It is taught that the implementation of stages (a) and (b) makes it possible to extend the life span of the hydroconversion catalyst of stage (c) as well as the selectivity of the catalyst vis-à-vis the production of gas oil. It is also taught that the hydrogen required for implementing stages (a) and (c) can be generated by any process known to a person skilled in the art without any indication being provided as to the purity of the hydrogen used.

U.S. Pat. No. 6,709,569 B2 describes a specific process for the production of hydrocarbon effluent of middle distillates type from a feedstock originating from a Fischer-Tropsch synthesis process, said feedstock being fractionated into a light fraction and a heavy fraction, such that said light fraction is subjected to a stage of removal of oxides of carbon dissolved in said light fraction ($C_3$-$C_{20}$ fraction) by stripping, distillation or fractionation before being subjected to a stage of hydrotreatment and hydrocracking in a mixture with said heavy fraction. It is also mentioned that the hydrogen source used can be a hydrogen-containing gas which does not contain sufficiently large quantities of impurities to affect the activity of the hydrotreatment catalyst. No mention is therefore made of the nature of the impurities contained in the hydrogen and their impact on the activity of the hydrocracking catalyst in the case where it exceeds a certain threshold.

In fact, the production processes for middle distillates from a paraffinic feedstock produced by Fischer-Tropsch synthesis can use hydrogen originating from different sources. According to the nature of the different sources, the hydrogen used in the process according to the invention may or may not contain impurities. For example a catalytic reforming unit produces hydrogen during the dehydrogenation reactions of the naphthenes into aromatics and during the dehydrocyclization reactions. The hydrogen produced by a catalytic reforming unit is substantially devoid of CO and $CO_2$. The hydrogen can also be produced by other methods such as for example by steam reforming of light hydrocarbons or also by the partial oxidation of different hydrocarbons like heavy residues. The steam reforming consists of converting a light hydrocarbon feedstock into synthesis gas, i.e. into a mixture of hydrogen ($H_2$), carbon monoxide (CO), carbon dioxide ($CO_2$), and water ($H_2O$) by steam reaction over a nickel-based catalyst. In this case the production of hydrogen is also accompanied by the formation of carbon monoxide which is substantially removed by conversion to steam according to the water-gas shift process into carbon dioxide ($CO_2$), then by removing the $CO_2$ by absorption for example by a solution of amines. There can also be removal of the residual carbon monoxide (CO) by a methanation stage. Other sources of hydrogen can also be used such as the hydrogen originating from the catalytic cracking gases which contain significant quantities of CO and of $CO_2$. Thus, depending on its origin(s), the hydrogen used in the process for the production of middle distillates from a paraffinic feedstock produced by Fischer-Tropsch synthesis can contain several hundreds of ppm by volume of carbon oxides.

While trying to develop a process for the production of middle distillates from a paraffinic feedstock produced by Fischer-Tropsch synthesis, the applicant discovered that the presence of carbon monoxide (CO), carbon dioxide ($CO_2$), and more generally the presence of molecules containing at least one oxygen atom in the hydrogen, even at low atomic oxygen contents, has a negative impact on the performance of the hydrocracking and hydroisomerization catalyst when the paraffinic feedstock to be hydroisomerized and hydrocracked is substantially devoid of oxygen-containing compounds, such as carbon monoxide and carbon dioxide (CO and $CO_2$), water or also alcohols and/or carboxylic acids, esters and ketones, as is the case for example after a hydrotreatment stage. In fact, in the case of a paraffinic feedstock originating from the Fischer-Tropsch process which contains a significant quantity of oxygen-containing compounds, i.e. which has not been hydrotreated, the impact of said oxygen-containing compounds contained in said feedstock is significantly greater than the impact of the presence of impurities containing at least one oxygen atom in the hydrogen, which then becomes negligible. On the other hand, when the paraffinic feedstock is substantially devoid of oxygen-containing compounds, the presence in the hydrogen of impurities containing at least one oxygen atom has a negative impact on the hydroisomerization/hydrocracking catalyst.

Thus, the applicant has developed a process for the production of middle distillates using a paraffinic feedstock produced by Fischer-Tropsch synthesis which is subjected to a hydrotreatment stage so as to decompose the oxygen-containing compounds present in said feedstock, then a stage of removal of the impurities containing at least one oxygen atom originating from the decomposition of the oxygen-containing compounds during the hydrotreatment stage and in particular carbon monoxide (CO), carbon dioxide ($CO_2$), and water ($H_2O$), before being sent to a hydrocracking/hydroisomerization stage which operates in the presence of a hydrogen stream containing a limited content of molecules containing at least one oxygen atom.

The expression "molecules containing at least one oxygen atom" present in the hydrogen will hereinafter be defined as being essentially carbon monoxide CO, carbon dioxide $CO_2$ and water $H_2O$.

SUBJECT OF THE INVENTION

The present invention therefore relates to a process for the production of middle distillates from a paraffinic feedstock produced by Fischer-Tropsch synthesis comprising at least:

a) a hydrotreatment stage of said feedstock in the presence of hydrogen and of a hydrotreatment catalyst at a temperature comprised between 100 and 450° C., at a pressure comprised between 0.5 to 15 MPa, the hydrogen being introduced into said hydrotreatment stage at a flow rate such that the hydrogen/feedstock ratio by volume is comprised between 50 to 10000 normal liters per liter, and at a hourly volume velocity that is comprised between 0.1 and 10 $h^{-1}$, b) a stage of separating at least one portion of the effluent originating from stage a) into at least one light fraction, at least one hydrocarbon liquid effluent and at least one liquid effluent comprising water, c) a stage of hydroisomerization/hydrocracking of at least one portion of the hydrocarbon liquid effluent originating from stage b), in the presence of a hydroisomerization/hydrocracking catalyst and of a hydrogen stream having been subjected to a purification stage in the case where the atomic oxygen content in said hydrogen stream is greater than 500 ppm by volume, d) a stage of fractionation of the effluent originating from stage c) in order to obtain at least one middle distillate fraction.

More particularly the invention relates to a process for the production of middle distillates from a paraffinic feedstock produced by Fischer-Tropsch synthesis, in which both said paraffinic feedstock originating from the Fischer-Tropsch synthesis and the hydrogen stream used in the hydrocracking/hydroisomerization stage comprise a limited content of molecules containing at least one oxygen atom.

An advantage of the process according to the invention is making it possible to increase the quantity of available middle distillates by hydrocracking the heavier paraffinic compounds present in the effluent originating from the Fischer-Tropsch unit and which have boiling points that are higher than those of the kerosene and gas oil cuts, for example the 370° C.⁺ fraction and thus to maximize the middle distillates yield for given operating conditions.

DETAILED DESCRIPTION OF THE INVENTION

According to stage a) of the process according to the invention, said paraffinic feedstock is subjected to a hydrotreatment stage in the presence of hydrogen and of a hydrotreatment catalyst at a temperature comprised between 100 and 450° C., at a pressure comprised between 0.5 to 15 MPa, the hydrogen being introduced into said hydrotreatment stage at a flow rate such that the hydrogen/hydrocarbons volume ratio is comprised between 50 to 10000 normal liters per liter, and at an hourly volume velocity of the paraffinic feedstock comprised between 0.1 and 10 h$^{-1}$.

Said paraffinic feedstock produced by Fischer-Tropsch synthesis can optionally be subjected to a fractionation stage prior to the hydrotreatment stage a) of the process according to the present invention.

According to the invention, said paraffinic feedstock used in the process according to the invention is produced by Fischer-Tropsch synthesis according to processes known to a person skilled in the art.

In the Fischer-Tropsch process, the synthesis gas (CO+H$_2$) is catalytically converted into oxygen-containing products and essentially linear hydrocarbons in gaseous, solid or liquid form. Said obtained products constitute the feedstock of the process according to the invention. The synthesis gas (CO+H$_2$) is advantageously produced from natural gas, coal, biomass, any source of hydrocarbon compounds or a mixture of these sources.

Preferably, said paraffinic feedstock produced by Fischer-Tropsch synthesis and used in the process according to the invention comprises mainly n-paraffins. Thus, said feedstock comprises an n-paraffin content greater than 60% by weight with respect to the total mass of said feedstock. Said feedstock can also comprise an oxygen-containing products content preferably less than 10% by weight, an unsaturates content, i.e. preferably of olefinic products, preferably less than 20% by weight and an iso-paraffins content preferably less than 10% by weight with respect to the total mass of said feedstock.

Very preferably, said feedstock comprises an n-paraffins content greater than 70% by weight and even more preferably greater than 80% by weight with respect to total mass of said feedstock.

Preferably, said paraffinic feedstock produced by Fischer-Tropsch synthesis is devoid of heteroatom impurities such as, for example, sulphur, nitrogen or metals.

Preferably, said hydrotreatment stage operates at a temperature comprised between 150 and 430° C., preferably between 150 and 380° C., at a pressure comprised between 1 and 10 MPa and preferably between 1 and 9 MPa, with a hydrogen flow rate such that the hydrogen/hydrocarbon volume ratio is comprised between 100 and 3000 normal liters per liter and more preferably between 150 and 1500 normal liters per liter and at an hourly volume velocity comprised between 0.2 and 10 h$^{-1}$ and preferably between 0.2 and 5 h$^{-1}$.

Said hydrotreatment catalysts used in said stage b) are conventional hydrotreatment catalysts that are noncracking or slightly cracking, known to a person skilled in the art. Preferred hydrotreatment catalysts are described in patent FR 2 826 972.

Said hydrotreatment stage a) aims to reduce the content of the olefinic compounds and unsaturates as well as decomposing the oxygen-containing compounds, in particular the alcohols and the acids present in said feedstock, as well as optionally decomposing any traces of sulphur- and nitrogen-containing compounds present in the heavy fraction. This hydrotreatment stage is non-converting, i.e. the operating conditions are set so that the conversion of the 370° C.$^+$ fraction to the 370° C. fraction is preferably less than 20% by weight, preferably less than 10% by weight and very preferably less than 5% by weight.

Under these conditions and on leaving the hydrotreatment stage a), the contents of unsaturated and oxygen-containing compounds present in said feedstock are reduced to less than 0.5% by weight and to approximately less than 0.1% by weight in general.

According to stage b) of the process according to the invention, at least one stage of separating at least one portion and preferably all of the effluent originating from stage a) is implemented. Said stage b) makes it possible to separate at least one light fraction, at least one hydrocarbon liquid effluent and at least one liquid effluent comprising water.

Said light fraction comprises at least one gaseous fraction which comprises the unconverted hydrogen, the impurities containing at least one oxygen atom originating from the decomposition of the oxygen-containing compounds during the hydrotreatment stage a) and optionally the C$_4^-$ compounds, i.e. the C$_1$ to C$_4$ compounds preferably having a final boiling point below 20° C.

Said separation stage b) therefore also allows the removal from the effluent directed towards the hydrocracking/hydroisomerization stage c) of the impurities containing at least one oxygen atom and preferably carbon monoxide (CO), carbon dioxide (CO$_2$) and water (H$_2$O) present after the hydrotreatment stage.

The more or less complete removal of at least one liquid effluent comprising water is advantageously a function of the water tolerance of the hydrocracking/hydroisomerization catalyst used downstream.

Said separation stage b) can advantageously be carried out by all the methods and techniques known to a person skilled in the art. Preferably, said stage b) is advantageously carried out by distillation, stripping and/or flash distillation, combined with drying, passing over a desiccant, solvent extraction, decanting or by combining at least two of these methods.

Preferably, said stage b) comprises a flash chromatography stage followed by decanting.

The atomic oxygen content of the hydrocarbon liquid effluent containing the paraffinic hydrocarbons originating from separation stage b) of the process according to the invention, expressed in parts per million by weight (ppm) is preferably less than 500 ppm, preferably less than 300 ppm, very preferably less than 100 ppm by weight. The content in ppm by weight of atomic oxygen in the paraffinic feedstock originating from stage b) is measured by the infra-red absorption technique such as for example the technique described in Patent Application US2009/0018374A1.

According to stage c) of the process according to the invention, at least one portion and preferably the whole of the hydrocarbon liquid effluent originating from stage b), is sent to a hydroisomerization/hydrocracking stage in the presence of a hydroisomerization/hydrocracking catalyst and a hydrogen stream having been subjected to a purification stage before being introduced into said stage c), in the case where the atomic oxygen content in said hydrogen stream is greater than 500 parts per million by volume.

Preferably, said hydrogen stream is subjected to a purification stage in the case where the atomic oxygen content in said hydrogen stream is greater than 250 ppm by volume. Preferably, said hydrogen stream is subjected to a purification stage in the case where the atomic oxygen content in said hydrogen stream is greater than 50 ppm by volume.

Said hydrogen stream used in the process according to the invention and preferably in stage c) of the process according to the invention is advantageously generated by methods known to a person skilled in the art such as for example a process of catalytic reforming or catalytic cracking of the gases.

Depending on the nature of the different sources, the hydrogen used in the process according to the invention may or may not contain impurities. The atomic oxygen content in said hydrogen stream can be measured by any method known to a person skilled in the art such as for example by gas chromatography.

Preferably, said hydrogen stream can be fresh hydrogen or a mixture of fresh hydrogen and recycled hydrogen, i.e. hydrogen not converted during hydroisomerization/hydrocracking stage c) and recycled in said stage c). Preferably, the fresh hydrogen or the mixture of fresh hydrogen and recycled hydrogen can advantageously be purified in the same purification stage.

In the case where said hydrogen stream contains an atomic oxygen content greater than 500 ppm volume, preferably greater than 250 ppm volume and preferably greater than 50 ppm by volume, said hydrogen stream is subjected to a purification stage before being introduced in said stage c).

Said stage of purification of the hydrogen stream can advantageously be carried out according to any method known to a person skilled in the art.

Preferably, said purification stage is advantageously implemented according to the PSA "Pressure Swing Adsorption" or TSA "Temperature Swing Adsorption" methods of washing with chemical or physical solvents, methanation, preferential oxidation, molecular sieve (collection on alumina) membrane methods, used alone or combined.

When the process uses hydrogen recycling, purging the recycled hydrogen can also advantageously be carried out in order to limit the accumulation of molecules containing at least one oxygen atom such as carbon monoxide CO or carbon dioxide $CO_2$ and thus limit the atomic oxygen content in said hydrogen stream.

According to the invention, the atomic oxygen content in said hydrogen stream used in the process according to the invention and preferably in stage c) of the process according to the invention, expressed in parts per million by volume (ppmv), must be less than 500 ppmv, preferably less than 250 ppmv and very preferably less than 50 ppmv. The atomic oxygen content in said hydrogen stream is calculated from the concentrations of molecules having at least one oxygen atom in said hydrogen stream, weighted by the number of oxygen atoms present in said oxygen molecule. By way of example, considering a hydrogen stream containing CO or $CO_2$, the atomic oxygen content contained in said hydrogen stream is then equal to:

$$ppmv\ (O) = ppmv\ (CO) + 2 * ppmv\ (CO_2)$$

with:
ppmv (O) atomic oxygen content of the hydrogen stream in parts per million by volume,
ppmv (CO) carbon monoxide content of the hydrogen stream in parts per million by volume,
ppmv ($CO_2$) carbon dioxide content of the hydrogen stream in parts per million by volume.

In the case where said hydrogen stream contains an atomic oxygen content less than 500 ppmv, preferably less than 250 ppmv and preferably less than 50 ppm by volume, no purification stage of said hydrogen stream is implemented before said stream is introduced in said stage c).

The hydrocracking/hydroisomerization catalyst used in stage c) of the process according to the invention comprises preferably at least one hydro-dehydrogenating metal chosen from the group formed by the group VIB and group VIII metals of the periodic table and at least one solid Bronsted acid, and optionally a binder.

Preferably, said hydrocracking/hydroisomerization catalyst comprises either at least one group VIII noble metal chosen from platinum and palladium, alone or in a mixture, active in their reduced form, either at least one group VIII non-noble metal chosen from nickel and cobalt in combination with at least one group VI metal chosen from molybdenum and tungsten, alone or in a mixture, and used preferably in their sulphurated form.

In the case where said catalyst comprises at least one group VIII noble metal, the noble metal content of the hydrocracking catalyst is advantageously comprised between 0.01 and 5 wt. % with respect to the finished catalyst, preferably between 0.05 and 4% by weight and very preferably between 0.10 and 2% by weight.

In the case where said catalyst comprises at least one group VI metal in combination with at least one group VIII non-noble metal, the group VI metal content of said hydrocracking/hydroisomerization catalyst is advantageously comprised in oxide equivalent between 5 and 40% by weight with respect to the finished catalyst, preferably between 10 and 35% by weight and the group VIII metal content of said catalyst is advantageously comprised between 0.5 and 10% by weight with respect to the finished catalyst, preferably between 1 and 8% by weight and very preferably between 1.5 and 6% by weight.

The metallic function is advantageously introduced onto said catalyst by any method known to a person skilled in the art, for example co-mixing, dry impregnation or exchange impregnation.

Preferably, the solid Bronsted acid is constituted by silica alumina or zeolite Y. Optionally, a binder can advantageously also be used during the stage of forming the support. Preferably a binder is used when zeolite is used.

Said binder is advantageously chosen from silica ($SiO_2$), alumina ($Al_2O_3$), clays, titanium oxide ($TiO_2$), boron oxide ($B_2O_3$) and zirconia ($ZrO_2$), alone or in a mixture. Preferably, said binder is chosen from silica and alumina and even more preferably, said binder is alumina in all its forms known to a person skilled in the art, such as for example gamma alumina.

A preferred hydrocracking/hydroisomerization catalyst advantageously comprises at least one noble metal, said noble metal being platinum and a solid Bronsted acid of the silica alumina type, without any binder. The silica content of the silica-alumina, expressed as a percentage by weight, is generally comprised between 1 and 95%, advantageously between 5 and 95% and preferably between 10 and 80% and even more preferably between 20 and 70% and between 22 and 45%. This silica content is accurately measured using X-ray fluorescence.

Several preferred catalysts used in hydrocracking/hydroisomerization stage c) of the process according to the invention are described hereinafter.

A preferred hydrocracking/hydroisomerization catalyst used in the process according to the invention comprises a particular silica-alumina. Preferably, said catalyst comprises, and preferably is essentially constituted by, 0.05 to 10% by weight and preferably comprised between 0.1 and 5% by weight of at least one group VIII noble metal, preferably chosen from platinum and palladium and preferably, said noble metal being platinum, deposited on a silica-alumina support, without any binder, containing a quantity of silica ($SiO_2$) comprised between 1 and 95%, expressed as a percentage by weight, preferably between 5 and 95%, preferably between 10 and 80% and very preferably between 20 and 70% and even more preferably between 22 and 45%, said catalyst having:
- a specific BET surface area of 100 to 500 m²/g, preferably comprised between 200 m²/g and 450 m²/g and very preferably between 250 m²/g and 450 m²/g,
- a mean diameter of the mesopores comprised between 3 and 12 nm, preferably comprised between 3 nm and 11 nm and very preferably between 4 nm and 10.5 nm,
- a pore volume the diameter of which is comprised between the mean diameter as defined previously reduced by 3 nm and the mean diameter as defined previously increased by 3 nm is greater than 40% of the total pore volume, preferably comprised between 50% and 90% of the total pore volume and very preferably comprised between 50% and 70% of the total pore volume,
- a total pore volume comprised between 0.4 and 1.2 ml/g, preferably between 0.5 and 1.0 ml/g and very preferably between 0.5 and 0.9 ml/g,
- a volume of the macropores, the diameter of which is greater than 50 nm, and preferably comprised between 100 nm and 1000 nm, representing between 5 and 60% of the total pore volume, preferably between 10 and 50% of the total pore volume and even more preferably between 10 and 40% of the total pore volume,
- a content of alkali or alkaline-earth compounds less than 300 ppm by weight and preferably less than 200 ppm by weight.

The mean diameter of the mesopores is defined as being the diameter corresponding to the cancellation curve derived from the mercury intrusion volume obtained from the mercury porosity curve for pore diameters comprised between 2 and 50 nm. The mean diameter of the mesopores of the catalyst is advantageously measured from the porous distribution profile obtained using a mercury porosimeter.

Preferably, the dispersion of the metal of said preferred catalyst is advantageously comprised between 20% and 100%, preferably between 30% and 100% and very preferably between 40 and 100%. The dispersion, representing the fraction of metal accessible to the reagent with respect to the total quantity of metal of the catalyst, is advantageously measured, for example, by $H_2/O_2$ titration or by transmission electron microscopy.

Preferably, the distribution coefficient of the noble metal of said preferred catalyst is greater than 0.1, preferably greater than 0.2 and very preferably greater than 0.4. The distribution of the noble metal represents the distribution of the metal within the catalyst particle, it being possible for the metal to be well or poorly dispersed. Thus, it is possible to obtain platinum that is badly distributed (for example detected in a ring the thickness of which is clearly less than the radius of the particle) but well dispersed i.e. all the platinum atoms, situated in a ring, are accessible to the reagents. The distribution coefficient of the noble metal can be measured by a Castaing microprobe.

The noble metal salt is advantageously introduced by one of the usual methods used for depositing the metal on the surface of a solid. One of the preferred methods is dry impregnation, which consists of the introduction of the metal salt in a volume of solution which is equal to the pore volume of the solid mass to be impregnated. Before the reduction operation, the catalyst can advantageously be subjected to calcination such as for example a treatment under dry air at a temperature of 300 to 750° C. and preferably at a temperature equal to 520° C., for 0.25 to 10 hours and preferably for 2 hours. Another preferred hydrocracking/hydroisomerization catalyst used in the process according to the invention comprises at least one hydrodehydrogenating element chosen from the group formed by the elements of group VIB and of group VIII of the periodic table, from 0.01 to 5.5% by weight of oxide of a doping element chosen from phosphorus, boron and silicon and a silica-alumina based non-zeolitic support containing a quantity greater than 5% by weight and less than or equal to 95% by weight of silica ($SiO_2$), said catalyst having the following characteristics:
- a mean mesopore diameter, measured by mercury porosimetry, comprised between 2 and 14 nm,
- a total pore volume, measured by mercury porosimetry, comprised between 0.1 ml/g and 0.5 ml/g,
- a total pore volume, measured by nitrogen porosimetry, comprised between 0.1 ml/g and 0.5 ml/g,
- a specific BET surface area comprised between 100 and 550 m²/g,
- a pore volume, measured by mercury porosimetry, comprised in the pores of diameter greater than 14 nm, that is less than 0.1 ml/g,
- a pore volume, measured by mercury porosimetry, comprised in the pores of diameter greater than 16 nm, that is less than 0.1 ml/g,
- a pore volume, measured by mercury porosimetry, comprised in the pores of diameter greater than 20 nm, that is less than 0.1 ml/g,
- a pore volume, measured by mercury porosimetry, comprised in the pores of diameter greater than 50 nm, that is less than 0.1 ml/g.
- an X-ray diffraction pattern which contains at least the main lines characteristic of at least one of the transition aluminas comprised in the group composed of alpha, rho, chi, eta, gamma, kappa, theta and delta aluminas,
- a packed filling density greater than 0.7 g/ml.

Another preferred hydrocracking/hydroisomerization catalyst used in the process according to the invention comprises (and preferably is essentially constituted by) 0.05 to 10% by weight and preferably 0.1 and 5% by weight of at least one group VIII noble metal, preferably chosen from platinum and palladium and preferably, said noble metal being platinum, deposited on a silica-alumina support, without any binder, containing a quantity of silica ($SiO_2$) comprised between 1 and 95%, expressed as a percentage by weight, preferably between 5 and 95%, preferably between 10 and 80% and very preferably between 20 and 70% and even more preferably between 22 and 45%, said catalyst having:
- a specific BET surface area of 150 to 600 m²/g, preferably comprised between 200 m²/g and 600 m²/g,
- a mean diameter of the mesopores comprised between 3 and 12 nm, preferably comprised between 3 nm and 11 nm and very preferably between 4 nm and 10.5 nm,
- a pore volume the diameter of which is comprised between the mean diameter as defined previously reduced by 3 nm and the mean diameter as defined previously increased by 3 nm is greater than 60% of the total pore volume, preferably greater than 70% of the total pore volume and very preferably greater than 80% of the total pore volume,
- a total pore volume less than 1 ml/g, preferably comprised between 0.1 and 0.9 ml/g and very preferably between 0.2 and 0.8 ml/g,
- a content of alkali or alkaline-earth compounds less than 300 ppm by weight and preferably less than 200 ppm by weight.

Preferably, the dispersion of said preferred catalyst used in stage d) of the process according to the invention is advantageously comprised between 20% and 100%, preferably between 30% and 100% and very preferably between 40% and 100%.

Preferably, the distribution coefficient of the noble metal of said preferred catalyst used in stage d) of the process according to the invention is greater than 0.1, preferably greater than 0.2 and very preferably greater than 0.4. This distribution coefficient is measured by Castaing microprobe.

The first hydrotreatment/hydrocracking stage c) advantageously operates at a temperature comprised between 200 and 450° C., preferentially between 250 and 450° C., preferably between 300 and 450° C., and preferably between 320 and 420° C. at a pressure comprised between 0.2 and 15 MPa, preferably between 0.5 and 10 MPa and preferably between 1 to 9 MPa, at a space velocity that is comprised between 0.1 h$^{-1}$ and 10 h$^{-1}$ and preferably between 0.2 and 7 h$^{-1}$ and advantageously between 0.5 and 5.0 h$^{-1}$ and at a hydrogen ratio that is comprised between 100 and 2000 normal liters of hydrogen per liter of feedstock per hour, and preferentially between 150 and 1500 normal liters of hydrogen per liter of feedstock.

Stage c) of hydroisomerization and hydrocracking of the process according to the invention is advantageously carried out under conditions such that the conversion per pass of products at boiling points greater than or equal to 370° C. to products having boiling points less than 370° C. is greater than 40% by weight, and even more preferably at least 40%, preferably greater than 50%, so as to obtain middle distillates (kerosene and gas oil).

According to stage d) of the process according to the invention, the hydrocracked/hydroisomerized effluent originating from stage c) is subjected to a fractionation stage, preferably in a distillation train which incorporates atmospheric distillation and optionally distillation under vacuum. The purpose of said stage d) is to separate the conversion products having a boiling point less than 300° C., preferably less than 340° C. and even more preferably less than 370° C. and including in particular those formed during stage (c) in the hydroisomerization/hydrocracking reactor, and to separate the residual fraction the initial boiling point of which is generally greater than at least 340° C. and preferably greater than or equal to at least 370° C. Among the conversion products and hydroisomerized products, as well as the C$_1$-C$_4$ light gases, at least one gasoline (or naphtha) fraction and at least one kerosene and gas oil middle distillate fraction are moreover separated. Preferably, the residual fraction, the initial boiling point of which is generally greater than at least 300° C., preferably greater than or equal to 340° C. and preferably greater than or equal to at least 370° C. is recycled in hydroisomerization and hydrocracking stage c) of the process according to the invention. According to another embodiment of stage d) of the process according to the invention, said residual fraction can provide excellent bases for oils.

It can be also advantageous to recycle at least partially and preferably in total, in stage (c), the at least one of the kerosene and gas oil cuts thus obtained. The gas oil and kerosene cuts are preferably recovered separately or mixed, but the cut points are adjusted by the operator according to need. It was found advantageous to recycle a portion of the kerosene to improve its low-temperature properties.

EXAMPLES

Example 1

Preparation of the Hydrotreatment Catalyst (C1)

The catalyst is an industrial catalyst based on a noble metal of palladium on alumina type with a palladium content of 0.3% by weight with respect to the total weight of the finished catalyst, supplied by the company AXENS.

Example 2

Preparation of a Hydroisomerization and Hydrocracking Catalyst According to the Invention (C2)

The silica-alumina powder is prepared according to the synthesis protocol described in patent FR 2 639 256 (Example 3). The quantities of orthosilicic acid and aluminium alcoholate are chosen so as to have a composition of 70% by weight of Al$_2$O$_3$ and 30% by weight of SiO$_2$ in the final solid.

The dried powder is brought into contact with an aqueous solution of nitric acid, the quantity of nitric acid being 5% by weight with respect to the quantity of powder and the quantity of aqueous solution such that the loss on ignition at 550° C. of the cake obtained is approximately 60% by weight. This cake is mixed then extruded. The mixing is done with a Z-arm mixer. The extrusion is carried out by passing the paste through a die with openings of 1.4 mm diameter. The extrudates thus obtained are dried in an oven at 110° C. then calcined under a dry air flow (rate of increase of 5° C./min). The calcination temperature is adjusted so as to obtain a specific surface area of 310 m$^2$/g.

The silica-alumina extrudates are then subjected to a step of dry impregnation by an aqueous solution of hexachloroplatinic acid H$_2$PtCl$_6$, left to stand in a water soaker for 24 hours at ambient temperature then calcined for two hours under dry air in a fluidized bed at 500° C. (rate of increase of 5° C./min). The content by weight of platinum in the final catalyst after calcination is 0.70%.

The characteristics of the catalyst thus prepared are as follows:
- a mean diameter of the mesopores of 6.5 nm,
- a pore volume the diameter of which is comprised between the mean diameter as defined previously reduced by 3 nm and the mean diameter as defined previously increased by 3 nm equal to 60% of the total pore volume,
- a total pore volume of 0.70 ml/g,
- a volume of the macropores, the diameter of which is greater than 50 nm represents 29% of the total pore volume
- a BET surface area of 310 m$^2$/g,
- a sodium content of 110±13 ppm by weight,
- a dispersion of the noble metal of 85%,
- a distribution coefficient of the noble metal equal to 0.92.

Example 3

Treatment of a Feedstock Originating from the Fischer-Tropsch Process According to the Method of the Invention A feedstock originating from the Fischer-Tropsch synthesis on a cobalt catalyst is separated into two fractions by distillation, the heavier fraction having the characteristics shown in Table 1.

TABLE 1 characteristics of the heavy fraction

| | |
|---|---|
| Simulated distillation | T (5% by weight): 175° C.<br>T (25% by weight): 246° C.<br>T (50% by weight): 346° C.<br>T (75% by weight): 444° C.<br>T (95% by weight): 570° C. |
| 370° C.$^+$ compounds (by GC) | 43% by weight |
| density at 15° C. | 0.797 |
| nitrogen content | 7 ppm |
| sulphur content | <detection limit |
| total content of atomic oxygen (by IR) | 3000 ppm |
| detailed analysis of the $C_{30}^-$ fraction (GC) | |
| n-paraffins | 82% by weight |
| i-paraffins | 6% by weight |
| olefins | 11% by weight |
| oxygen-containing compounds | 1% by weight |

The total content of atomic oxygen in said fraction is measured by the infrared absorption technique described in patent application US2009/0018374A1.

The content of oxygen-containing compounds represents the content of molecules comprising at least one oxygen atom present in the heavy fraction and is expressed as a percentage by weight with respect to the total pass of said fraction. The content of oxygen-containing compounds is measured by gas chromatography.

This heavy fraction is treated in a lost-hydrogen fluidized bed, i.e. with no hydrogen recycling, on the hydrotreatment catalyst C1 under operating conditions permitting removal of the olefinic and oxygen-containing compounds as well as traces of nitrogen.

The operating conditions selected are as follows:
hourly volume velocity VVH (volume of feedstock/volume of catalyst/hour)=2 h$^{-1}$
total working pressure: 5 MPa
hydrogen/feedstock ratio: 200 normal liters/liter
temperature: 270° C.

The hydrotreated effluent is then subjected to a step of separation by flash distillation and decanting. On leaving said separation, the carbon monoxide and/or carbon dioxide and/or water and/or ammonia formed during the hydrotreatment by decomposition of the oxygen-containing compounds are removed.

The contents of the olefins and nitrogen-containing compounds of the effluent having been hydrotreated and subjected to said separation step fall below the detection thresholds and the oxygen content measured by IR is less than 50 ppm by weight, whereas the conversion of the 370° C.$^+$ fraction to 370° C.$^-$ fraction is negligible (less than 5% by weight). The characteristics of the heavy fraction after hydrotreatment and separation are shown in Table 2.

TABLE 2 characteristics of the heavy fraction after hydrotreatment and separation.

| | |
|---|---|
| Simulated Distillation | T (5% by weight): 172° C.<br>T (25% by weight): 242° C.<br>T (50% by weight): 343° C.<br>T (75% by weight): 441° C.<br>T (95% by weight): 568° C. |
| 370° C.$^+$ compounds (by GC) | 41% by weight |
| Density at 15° C. | 0.797 |
| Nitrogen content | <detection limit |
| Sulphur content | <detection limit |
| Oxygen content | <50 ppm |
| Detailed analysis of the $C_{30}^-$ fraction (GC) | |

TABLE 2-continued characteristics of the heavy fraction after hydrotreatment and separation.

| | |
|---|---|
| n-paraffins | 91% by weight |
| i-paraffins | 9% by weight |
| olefins | <detection limit |
| oxygen-containing | <detection limit |

The effluent having been hydrotreated and subjected to a flash distillation step and decanting constitutes the hydrocracking feedstock sent to the hydroisomerization and hydrocracking catalyst C2 according to the invention.

Before testing, the catalyst C2 is subjected to a reduction step under the following operating conditions:
hydrogen flow rate: 1600 normal liters per hour and per liter of catalyst
increase from ambient temperature to 120° C.: 10° C./min
plateau of one hour at 120° C.
increase from 120° C. to 450° C. at 5° C./min
plateau of two hours at 450° C.
pressure: 0.1 MPa After reduction, the catalytic test is carried out under the following conditions:
total pressure of 5 MPa,
hydrogen/feedstock ratio of 800 normal liters/liter
hourly volume velocity (VVH) equal to 2 h$^{-1}$ The hydrogen stream sent into the hydroisomerization/hydrocracking step is a U-quality hydrogen stream from Air Liquide, i.e. comprising an $O_2$ content<10 ppmv, and $H_2O$ content<40 ppmv. The atomic oxygen content of said hydrogen stream is therefore less than 60 ppmv.

The conversion of the 370° C. fraction is taken to be equal to;

$$C(370° C.^+)=[(\% \text{ of } 370° C.^-_{effluents})-(\% \text{ of } 370° C.^-_{feedstock})]/[100-(\% \text{ of } 370° C.^-_{feedstock})]$$

with
% of 370° C.$^-_{effluents}$=percentage by mass of compounds having boiling points less than 370° C. in the effluents, and
% de 370° C.$^-_{feedstock}$=percentage by mass of compounds having boiling points less than 370° C. in the hydrocracking feedstock.

The reaction temperature is adjusted to 347° C. so as to obtain a conversion rate of the 370° C.$^+$ fraction equal to 70% by weight. Analyses by gas chromatography make it possible to obtain the distribution of the various cuts in the hydrocracked effluent (Table 4):
$C_1$-$C_4$ cut: hydrocarbons with 1 to 4 carbon atoms inclusive
$C_5$-$C_9$ cut: hydrocarbons with 5 to 9 carbon atoms inclusive (naphtha cut)
$C_{10}$-$C_{14}$ cut: hydrocarbons with 10 to 14 carbon atoms inclusive (kerosene cut)
$C_{15}$-$C_{22}$ cut: hydrocarbons with 15 to 22 carbon atoms inclusive (gas oil cut)
$C_{22}^+$ cuts: hydrocarbons with more than 22 carbon atoms inclusive (370° C.$^+$ cut)

TABLE 4 distribution by cuts of the hydrocracked effluent (GC analysis).

| | % by weight |
|---|---|
| $C_1$-$C_4$ cut | 2.3 |
| $C_5$-$C_9$ cut | 11.6 |
| $C_{10}$-$C_{14}$ cut | 31.8 |

TABLE 4-continued distribution by cuts of the hydrocracked effluent (GC analysis).

| | % by weight |
|---|---|
| $C_{15}$-$C_{22}$ cut | 41.7 |
| $C_{22}^+$ cut | 12.6 |

Example 4

Treatment of a Feedstock Originating from the Fischer-Tropsch Process, not According to the Method of the Invention The hydrocracking step is carried out on the catalyst C2 under the same conditions as in example 3, except that the hydrogen stream used originates from a standard Air Liquide mixture currently containing 800 ppmv of CO, i.e. 800 ppmv of oxygen, said hydrogen stream not being subjected to a purification step.

Example 5

Treatment of a Feedstock Originating from the Fischer-Tropsch Process, not According to the Method of the Invention The hydrocracking step is carried out on the catalyst C2 under the same conditions as in example 3, except that the hydrogen used originates from a standard Air Liquide mixture currently containing 700 ppmv of $CO_2$, i.e. 1400 ppmv of oxygen, said flux of hydrogen not being subjected to a purification step.

Table 5 shows the distribution by cut of the hydrocracked effluent as a function of the oxygen content of the hydrogen of Examples 4 and 5 not according to the method of the invention.

TABLE 5 distribution by cuts of the hydrocracked effluent (GC analysis) as a function of the oxygen content of the hydrogen.

| atomic oxygen content of the hydrogen in ppmv | 700 | 1400 |
|---|---|---|
| $C_1$-$C_4$ cut % by weight | 2.0 | 1.8 |
| $C_5$-$C_9$ cut % by weight | 10.2 | 9.2 |
| $C_{10}$-$C_{14}$ cut % by weight | 30.6 | 30.0 |
| $C_{15}$-$C_{22}$ cut % by weight | 40.8 | 40.5 |
| $C_{22}^+$ cut % by weight | 16.4 | 18.5 |

Comparison of the results of Tables 4 and 5 shows that the presence of oxygen in the hydrogen has a negative effect on the performance of the hydrocracking and isomerization catalyst. Thus the percentage of middle distillates ($C_{10}$-$C_{22}$ cut) present in the hydrocracked effluent is reduced in the presence of oxygen in the hydrogen since this percentage passes from 73.5% for an atomic oxygen content less than 50 ppmv to 71.4% for a content equal to 700 ppmv and 70.5% for a content equal to 1400 ppmv.

The invention claimed is:

1. A process for the production of middle distillates from a paraffinic feedstock produced by Fischer-Tropsch synthesis, said feedstock having an n-paraffins content greater than 60% by weight with respect to the total mass of said feedstock, an oxygen-containing products content less than 10% by weight, an unsaturates content less than 20% by weight and an iso-paraffins content less than 10% by weight with respect to the total mass of said feedstock, said process consisting of:
   a) hydrotreating said feedstock in the presence of hydrogen and a hydrotreatment catalyst at a temperature between 100 and 450° C. and a pressure between 0.5 to 15 MPa, hydrogen being introduced for said hydrotreatment at a flow rate such that the hydrogen/feedstock ratio by volume is between 50 to 10000 normal liters per liter, and at a hourly volume velocity that is between 0.1 and 10 $h^{-1}$,
   b) separating at least one portion of effluent originating from hydrotreating a) into at least one light fraction, at least one hydrocarbon liquid effluent and at least one liquid effluent comprising water,
   c) hydroisomerizing/hydrocracking of at least one portion of hydrocarbon liquid effluent originating from b), in the presence of a hydroisomerization/hydrocracking catalyst and a hydrogen stream having an atomic oxygen content less than 500 ppm by volume, said stream having been subjected to purification in the case where the atomic oxygen content in said hydrogen stream is greater than 500 ppm by volume, and
   d) fractionation of effluent originating from c) in order to obtain at least one middle distillate fraction.

2. The process according to claim 1, in which the hydrotreatment a) is conducted at a temperature between 150 and 430° C., at a pressure between 1 and 10 MPa, with a hydrogen flow rate such that the hydrogen to feedstock volume ratio is between 100 and 3000 normal liters per liter and at an hourly volume velocity that is between 0.2 and 10 $h^{-1}$.

3. The process according to claim 1, in which said separation b) is a flash distillation stage followed by decanting.

4. The process according to claim 1, in which said hydrogen stream has an atomic oxygen content less than 250 ppm by volume or is subjected to purification in the case where the atomic oxygen content in said hydrogen stream is greater than 250 ppm by volume.

5. The process according to claim 1, in which said hydrogen stream has an atomic oxygen content less than 50 ppm by volume or is subjected to purification in the case where the atomic oxygen content in said hydrogen stream is greater than 50 ppm by volume.

6. The process according to claim 1, wherein the hydrogen stream used in the hydroisomerizing/hydrocracking (c) is subjected to purification to lower the atomic oxygen content to not greater than 500 ppm by volume and the purification is by PSA "Pressure Swing Adsorption" or TSA "Temperature Swing Adsorption" methods, washing with amines, methanation, preferential oxidation, or membrane methods, used alone or combined.

7. The process according to claim 1, in which said hydrocracking/hydroisomerization catalyst used in c) comprises at least one hydro-dehydrogenating metal that is a group VIB or group VIII metal of the periodic table and at least one solid Bronsted acid.

* * * * *